US011403414B2

(12) United States Patent
Naraidoo et al.

(10) Patent No.: US 11,403,414 B2
(45) Date of Patent: Aug. 2, 2022

(54) METHOD AND SYSTEM FOR SECURE STORAGE OF DIGITAL DATA

(71) Applicant: Red Flint LLP, Taunton (GB)

(72) Inventors: Marcus Naraidoo, Redland (GB); Joel Edward Sweeney, Welwyn Garden (GB)

(73) Assignee: Red Flint LLP, Taunton (GB)

( * ) Notice: Subject to any disclaimer, the term of this patent is extended or adjusted under 35 U.S.C. 154(b) by 234 days.

(21) Appl. No.: 16/652,173

(22) PCT Filed: Sep. 27, 2018

(86) PCT No.: PCT/GB2018/052761
§ 371 (c)(1),
(2) Date: Mar. 30, 2020

(87) PCT Pub. No.: WO2019/064009
PCT Pub. Date: Apr. 4, 2019

(65) Prior Publication Data
US 2020/0250327 A1 Aug. 6, 2020

(30) Foreign Application Priority Data

Sep. 28, 2017 (GB) .................................... 1715708

(51) Int. Cl.
*H04L 29/06* (2006.01)
*G06F 21/62* (2013.01)
(Continued)

(52) U.S. Cl.
CPC ...... *G06F 21/6218* (2013.01); *G06F 11/1464* (2013.01); *H04L 9/0894* (2013.01);
(Continued)

(58) Field of Classification Search
CPC ......................... G06F 21/6218; H04L 9/0894; H04L 67/1097
See application file for complete search history.

(56) References Cited

U.S. PATENT DOCUMENTS 8,667,273 B1 * 3/2014 Billstrom ............ G06F 21/6209
713/165
2012/0331088 A1 * 12/2012 O'Hare ............... H04L 67/1097
709/214
(Continued)

FOREIGN PATENT DOCUMENTS

WO 2010057199 A2 5/2010
WO 2010135412 A2 11/2010
(Continued)

OTHER PUBLICATIONS

PCT Search Report and Written Opinion for Application No. PCT/GB2018/052761 dated Dec. 4, 2018, 14 pages.
(Continued)

*Primary Examiner* — Wasika Nipa
(74) *Attorney, Agent, or Firm* — Maine Cernota & Rardin

(57) ABSTRACT

A method and system for secure storage of digital data offers enhanced resistance to threat actors (whether insiders or hackers) gaining unauthorised access to extract and manipulate data, and to brute force computational attacks. The method employs double randomised fragmentation of source data into a random number of fragments of random sizes, encryption of each fragment with a separate encryption key, storage of the encrypted fragments and keys and a catalogue of the mappings of locations and fragments to keys all in physically and logically separate locations in a secure storage estate (1). The method may be repeatedly applied to encrypted fragments, keys and catalogue in a cascade fragmentation process to add further levels of security.

13 Claims, 9 Drawing Sheets

(51) Int. Cl.
  *G06F 11/14*    (2006.01)
  *H04L 9/08*     (2006.01)
  *H04L 67/1097*  (2022.01)

(52) U.S. Cl.
  CPC ...... *H04L 67/1097* (2013.01); *G06F 2201/80* (2013.01); *G06F 2221/2107* (2013.01); *G06F 2221/2141* (2013.01)

(56) References Cited

U.S. PATENT DOCUMENTS

| | | | |
|---|---|---|---|
| 2013/0238900 A1 | 9/2013 | Leggette et al. | |
| 2015/0229476 A1* | 8/2015 | Lumb | G06F 21/62 |
| | | | 713/193 |
| 2015/0294118 A1* | 10/2015 | Parker | G06F 21/62 |
| | | | 726/26 |

FOREIGN PATENT DOCUMENTS

| | | | |
|---|---|---|---|
| WO | 2012167094 A1 | 12/2012 | |
| WO | 2015157699 A1 | 10/2015 | |

OTHER PUBLICATIONS

Great Britain Search Report for Application No. GB 1715708.2 dated Feb. 15, 2018, 4 pages.

\* cited by examiner

FIG. 1
| 1 - STORAGE ESTATE | | |
|---|---|---|
| 2 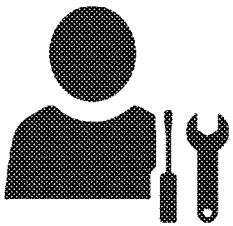 ADMINISTRATOR "A" | 3  PRIMARY CATALOGUE AND MAP STORE LOCATION | 4 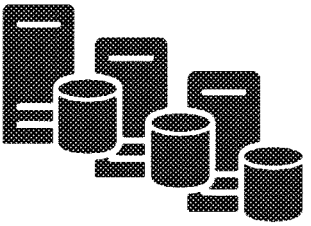 ADDITIONAL CATALOGUE AND MAP STORE LOCATIONS |
| 5 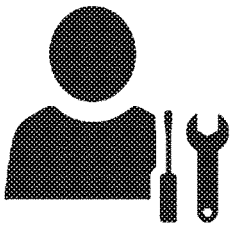 ADMINISTRATOR "B" | 6  PRIMARY KEY STORE LOCATION | 7  ADDITIONAL KEY STORE LOCATIONS |
| 8 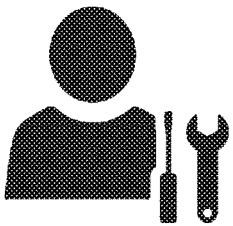 ADMINISTRATOR "C" | 9 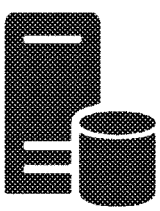 PRIMARY FRAGMENT STORE LOCATION | 10 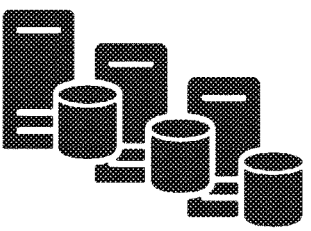 ADDITIONAL FRAGMENT STORE LOCATIONS |
| 11 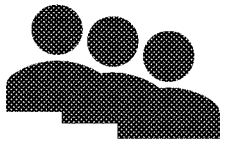 USERS | 12  SECURE REMOTE ACCESS | 13  DATA STAGING AREAS |
|---|---|---|

FIG. 2
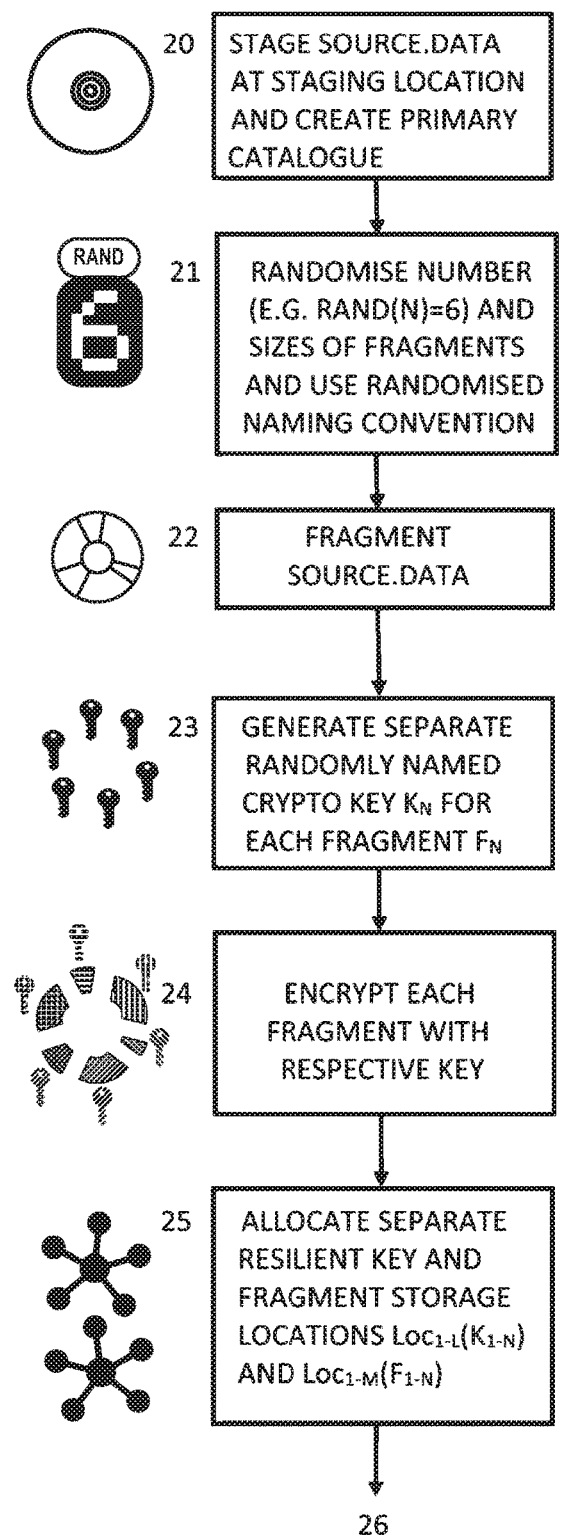
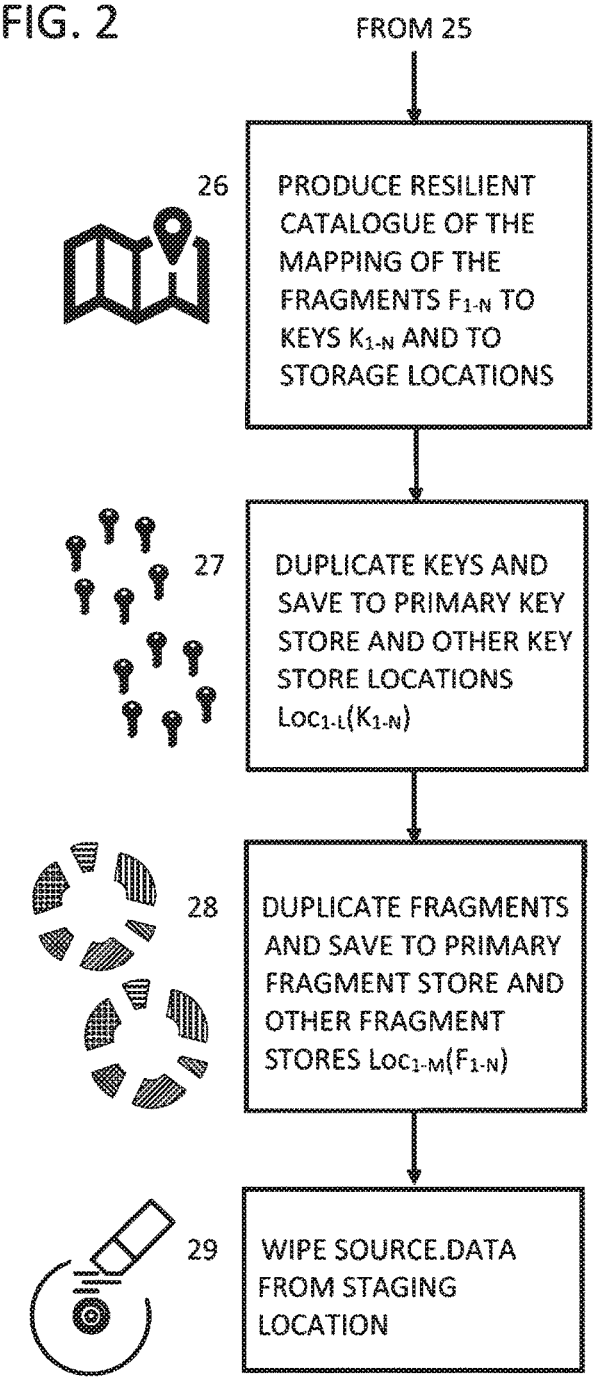

FIG. 7(1)

| DIFFERENT STAGES OF PRIOR ART AND PRESENT METHODS ||
| PRIOR ART (D1) | PRESENT INVENTION (M1) |
|---|---|
| 71<br>SCHEDULE SOURCE DATA FOR OPERATIONS | 171<br>SCHEDULE SOURCE DATA FOR OPERATIONS |
| | 172<br>CREATE USER CATALOGUE ENTRIES FOR SOURCE DATA |
| 73<br>SPLIT DATA INTO A FIXED NUMBER N OF SEGMENTS WITH A MAXIMUM DEPENDENT ON THE NUMBER OF AVAILABLE STORES | 173<br>RANDOMISE NUMBER AND SIZES OF FRAGMENTS FOR SPLITTING DATA AND USE RANDOMISED IDENTIFIERS |
| | 174<br>UPDATE USER CATALOGUE ENTRIES |
| 75<br>SPLIT DATA INTO N PREDEFINED SEGMENTS OF THE PRESCRIBED RELATIVE SIZES<br>$S_1 = $ ( 1100100111010 1100110 )<br>$S_2 = $ ( 11001001101010101 01 10001010010 ) | 175<br>FRAGMENT DATA INTO THE RANDOM NUMBER OF FRAGMENTS OF RANDOM SIZES |
| | 176<br>UPDATE USER CATALOGUE ENTRIES |
| 77<br>GENERATE 2N RANDOM NUMBERS OF LENGTHS MATCHING DATA SEGMENT SIZES<br>$R_1 = $ ( 1100100111010 1100110 )<br>$R_2 = $ ( 1101001110101 0100110 )<br>$R_3 = $ ( 11101000010111 0101010001010100 )<br>$R_4 = $ ( 10001010010101 10111101101 10111 ) | |
| 78<br>PERFORM PRESCRIBED SETS OF BINARY OPERATIONS COMBINING THE DATA SEGMENTS WITH THE RANDOM NUMBERS TO PRODUCE MODIFIED DATA SEGMENTS<br>$B_{11} = S_1$ XOR $R_1$ ; $B_{21} = S_2$ XOR $R_1$<br>$B_{12} = S_1$ XOR $R_2$ ; $B_{22} = S_2$ XOR $R_2$<br>$B_{13} = S_1$ XOR $R_3$ ; $B_{23} = S_2$ XOR $R_3$<br>$B_{14} = S_1$ XOR $R_4$ ; $B_{24} = S_2$ XOR $R_4$ | |

FIG. 7(2)

| DIFFERENT STAGES OF PRIOR ART AND PRESENT METHODS ||
|---|---|
| PRIOR ART (D1) | PRESENT INVENTION (M1) |
| 79<br>PERFORM FURTHER OPERATIONS COMBINING RESULTS OF STEP 78 TO PRODUCE PAIRED SETS OF DATA FOR DISTRIBUTED STORAGE<br><br>$P_{(1)11} = R_1 \times R_2 \quad P_{(1)21} = R_1 \times R_3 \quad P_{(1)31} = R_1 \times R_4$<br><br>$P_{(1)12} = R_1 \times B_{12} \quad P_{(1)22} = R_1 \times B_{13} \quad P_{(1)32} = R_1 \times B_{14}$<br><br>$P_{(1)13} = R_2 \times B_{11} \quad P_{(1)23} = R_3 \times B_{11} \quad P_{(1)33} = R_4 \times B_{11}$<br><br>$P_{(1)14} = B_{11} \times B_{12} \quad P_{(1)24} = B_{11} \times B_{13} \quad P_{(1)34} = B_{11} \times B_{14}$<br><br>$P_{(1)41} = R_2 \times R_3 \quad P_{(1)51} = R_2 \times R_4 \quad P_{(1)61} = R_3 \times R_4$<br><br>$P_{(1)42} = R_2 \times B_{13} \quad P_{(1)52} = R_2 \times B_{14} \quad P_{(1)62} = R_3 \times B_{14}$<br><br>$P_{(1)43} = R_3 \times B_{12} \quad P_{(1)53} = R_4 \times B_{12} \quad P_{(1)63} = R_4 \times B_{13}$<br><br>$P_{(1)44} = B_{12} \times B_{13} \quad P_{(1)54} = B_{12} \times B_{14} \quad P_{(1)64} = B_{13} \times B_{14}$<br><br>$P_{(2)11} = P_{(1)11} \quad P_{(2)21} = P_{(1)21} \quad P_{(2)31} = P_{(1)31}$   80<br><br>$P_{(2)12} = R_1 \times B_{22} \quad P_{(2)22} = R_1 \times B_{23} \quad P_{(2)32} = R_1 \times B_{24}$<br><br>$P_{(2)13} = R_2 \times B_{21} \quad P_{(2)23} = R_3 \times B_{21} \quad P_{(2)33} = R_4 \times B_{21}$<br><br>$P_{(2)14} = B_{21} \times B_{22} \quad P_{(2)24} = B_{21} \times B_{23} \quad P_{(2)34} = B_{21} \times B_{24}$<br><br>$P_{(2)41} = P_{(1)41} \quad P_{(2)51} = P_{(1)51} \quad P_{(2)61} = P_{(1)61}$   80<br><br>$P_{(2)42} = R_2 \times B_{23} \quad P_{(2)52} = R_2 \times B_{24} \quad P_{(2)62} = R_3 \times B_{24}$<br><br>$P_{(2)43} = R_3 \times B_{22} \quad P_{(2)53} = R_4 \times B_{22} \quad P_{(2)63} = R_4 \times B_{23}$<br><br>$P_{(2)44} = B_{22} \times B_{23} \quad P_{(2)54} = B_{22} \times B_{24} \quad P_{(2)64} = B_{23} \times B_{24}$ | |
| 81<br>GENERATE CRYPTOGRAPHIC KEYS – MINIMUM OF ONE KEY | 181<br>GENERATE CRYPTOGRAPHIC KEYS – SEPARATE, RANDOMLY NAMED, KEY FOR EACH FRAGMENT |
| 82<br>ENCRYPT DATA SETS 79 | 182<br>ENCRYPT EACH FRAGMENT 175 |
| | 183<br>UPDATE USER CATALOGUE ENTRIES |

FIG. 7(3)

| DIFFERENT STAGES OF PRIOR ART AND PRESENT METHODS ||
|---|---|
| PRIOR ART (D1) | PRESENT INVENTION (M1) |
| 84<br>ALLOCATE STORAGE FOR ENCRYPTED PAIRED SETS OF DATA | 184<br>ALLOCATE SEGREGATED STORAGE LOCATIONS FOR KEYS AND FRAGMENTS |
| 85<br>MOVE ENCRYPTED PAIRED SETS OF DATA TO SPECIFIED DATA STORAGE LOCATIONS | 185<br>MOVE ENCRYPTED FRAGMENTS AND KEYS TO STORAGE LOCATIONS |
| — | 186<br>CREATE RESILIENT REPLICATE USER CATALOGUES WITH POINTERS BETWEEN CATALOGUES |
| 87<br>ALLOCATE STORAGE FOR REPLICATION | |
| 88<br>REPLICATE ENCRYPTED PAIRED SETS OF DATA AND MOVE TO REPLICATE STORAGE LOCATIONS | 188<br>REPLICATE CRYPTOGRAPHIC KEYS AND FRAGMENTS |
| — | 189<br>ALLOCATE SEPARATE RESILIENT STORAGE LOCATIONS FOR REPLICATED KEYS AND FRAGMENTS |
| — | 190<br>MOVE REPLICATED KEYS AND FRAGMENTS TO SEPARATE ALLOCATED STORAGE LOCATIONS |
| — | 191<br>UPDATE USER CATALOGUE ENTRIES UPDATE REPLICATE CATALOGUES |

192 EXAMPLES OF REPLICATED CATALOGUE DATA IN PRESENT METHOD M1

| Catalogue No. | DB06.231 | | |
|---|---|---|---|
| Data Name | S | | |
| Rand. No. of Fragments | 4 | o. | DB21.710 |
| Fragment IDs | Baf, j38a, He49q, asdfg | | S |
| Key IDs | Ty8bd, 178hfb, g67a, 12f | Fragments | 4 |
| Fragment Storage | Li10, zc75c, b75kl, 2hd | s | Baf, j38a, He49q, asdfg |
| Key Storage | 9ns, hghoih, hi99, za64 | | Ty8bd, 178hfb, g67a, 12f |
| Alternative Catalogues | DB21.710 | orage | Li10, zc75c, b75kl, 2hd |
| Data Status | "Active" | | 9ns, hghoih, hi99, za64 |
| | | Alternative Catalogues | DB06.231 |
| | | Data Status | "Active" |

METHOD AND SYSTEM FOR SECURE STORAGE OF DIGITAL DATA

RELATED APPLICATIONS

This application is a national phase application filed under 35 USC § 371 of PCT Application No. PCT/GB2018/052761 with an International filing date of Sep. 27, 2018, which claims priority of GB Patent Application 1715708.2 filed Sep. 28, 2017. Both of these applications are incorporated by reference in their entirety for all purposes.

FIELD OF THE INVENTION

The present invention relates to a method and a system, and variations thereof, for the secure storage and processing of digital data, making use of random fragmentation, multiple encryption keys, and managed, distributed storage.

BACKGROUND TO THE INVENTION

Storage of digital data is typically performed with the data retaining their particular data type. For instance, pictures are stored as pictures, or documents as documents and so on. Data stored as such are particularly vulnerable to theft or ransomware, whether in bulk or as individual items. Schemes whereby the particular data type (for instance .jpg for pictures) is deleted or replaced with a surrogate present virtually no protection from computer literate threats, whether those threats are from individuals or from system-based algorithms (e.g. "bots").

Steps to make digital data more secure have included the generation of encryption keys that are used to encrypt and decrypt complete data, such as whole pictures or whole documents and so on. These keys can either be generated by the owners of the data or by custodians of the data, for instance Cloud providers (such as Amazon, Microsoft et al.). The management of the keys and the relationship of keys to encrypted files is undertaken by some form of key management process.

Vulnerabilities in keyless and keyed digital data have presented opportunities for hackers and insiders to access and steal or otherwise manipulate digital data outside the control of the owners of those data.

Attempts have been made to improve security using various techniques, including by segmentation of data. One method for parsing, or splitting data into two or more data segments to improve security is outlined in published patent application WO2015/135412 "Systems and methods for securing data in the Cloud (D1). Other examples of known methods are described in WO2010/057199 "Storage and retrieval of cryptographically-split data blocks to/from multiple storage devices", WO2015/157699 "Method and system for securing data", and US2013/238900 "Dispersed storage network secure hierarchical file directory".

D1 focusses on a user independent cryptographic system which operates on two or more portions of the original source data. It also refers to use of various other known security features such as data storage diversity, user authentication, cryptographic key generation, access control and others. D1 describes a technique, for instance, whereby two random numbers A and B are each combined with a Source Data segment, S, using a logical operation to produce scrambled data C=A*S, D=B*S. Composite data shares AB, BC, CD and AD are then formed and each encrypted using separate keys (AB with K1) (BC with K2) (CD with K3) and (AD with-K4). Each encrypted share is then stored and distributed together with the key used for encrypting another share. This system is designed to allow the source data, S, to be reconstituted using only a subset (of at least two in the case when the source data is not segmented) of the stored shared data pairs. This produces combines portions of the source data with randomly generated numbers, but introduces security weaknesses, as keys and data may be recovered together.

Furthermore, when the Source Data is segmented, for instance into two pieces, say $S_1$ and $S_2$, it becomes necessary to generate four, not two, random numbers, now $A_1$ and $A_2$, $B_1$ and $B_2$, which in turn create eight factors like C and D, and 48 sets of paired factors like A*S, C*D etc. In this case at least 16 (appropriately selected) sets of paired factors are required to recreate the source data. If the choice of sets of paired factors is not carefully made, as many as 48−6=42 of these sets may be needed. This makes managing the sets of paired factors an important aspect of any practical implementation of that method, which is not detailed in D1.

The complexity of the method described in D1 increases very significantly as the number of data segments increases, and the amount of computational storage increases correspondingly, such that the method described in D1 requires storage of 75× the size of the source data when it is split into two segments, and 391× the size of the source data for five segments.

The cryptographic method adopted in D1 is a public-private (or other) key process for the encryption of the sets of paired factors, these keys typically being combined and stored with selected factors. In D1, the use of one key-pair in the case where the source data is unsegmented and the resulting four sets of paired factors is a trivial case. In practice, for two or more fragments, the use of additional keys results in a linear increase the number of sets of paired factors. The use of three keys on five fragments would thus push the total size of the storage requirement to 3×391× the size of the original source data.

Summarising the approach of D1, it is mathematically naïve, computationally cumbersome, and requires excessive multiplication of source data storage space to obtain greater levels of security. A comprehensive comparison between the approach outlined in D1 and the method proposed in the present application is provided in the detailed description below with reference to FIG. 7, identifying the key characteristics and differences at equivalent logical stages of the processes.

SUMMARY OF THE INVENTION

The fundamental information science and information security approaches employed in the methods of the present invention present invention are dissimilar to and differ significantly from such previous approaches. In particular, the present method requires every component ("fragment") of split data to be retrievable, but the growth in storage space required is linear and only by a factor of 2×, and the processes are computationally simpler to implement. Resilience in data recovery is also dealt with differently and through the use of a multiply-resilient catalogue. The consequence is that the requirement that every portion of the encrypted and fragmented source data be available for the recovery of the original source data results in an added security feature.

In every scheme, any operation on source data has to be uniquely reversible so that some form of reverse operation on the encrypted data results in the recovery of the original source data. The methods of the present invention differ significantly from other schemes. The use of randomisation in number and sizes of fragments of the source data and separation of encryption keys avoids security weaknesses, which are flaws of the scheme outlined in D1 and the like.

As noted, the present invention requires that all of the randomised fragments of source data are available in order to reconstitute the original source data, not a subset of computationally paired factors. For instance, the scheme defined in D1 shows that in the case of one data segment at least two sets of paired factors are needed, or in the case of two segments at least 16 sets of paired factors are needed and these need to be carefully chosen or as many as 42 compound factors may potentially be required. (In essence, the situation in D1 where there is one segment would be equivalent to the source data not being fragmented at all in the present invention.)

Finally, the methods according to the present invention provide resilience in a different way to previous approaches. The invention also provides a method by which guaranteed deletion of the fragmented source data is achieved, which is frequently overlooked in other approaches.

The present invention in its various aspects is defined in the appended claims. To address the many weaknesses associated with digital data storage, availability and access, whether in retained IT data systems or in the Cloud, the present invention provides a method and system which operates on digital data of any form to enhance security by:

(a) splitting the original data, hereinafter referred to as the Source Data, into a random number of fragments (segments or shards or chunks) where each such fragment is of a random (essentially unpredictable) byte size;

(b) naming (or tagging) each fragment in a manner (e.g. using a random naming convention) which prevents association of fragments with one another or the Source Data;

(c) mapping the named fragments to one another in such a fashion that allows for recombination;

(d) generating separate encryption keys for each fragment (regardless of the particular encryption format);

(e) naming (or tagging) each key in a manner which prevents association of the key with any other key or any fragment;

(f) encrypting each fragment with a particular key;

(g) cataloguing (or otherwise storing in a separate data base) the relationships between fragments, their keys, and the recombination mapping;

(h) duplicating, one or more times, each encrypted fragment, each key, the mapping and the catalogue;

(i) distributing the duplicated fragments, keys, mappings and the catalogue across Information Technology (IT) systems, hereinafter referred to as the Storage Estate, in such a manner that the fragments, keys, mappings and catalogue are never kept together at a single location in the Storage Estate; and preferably (j) clearing down and securely deleting any data placed in temporary data storage and application platforms that were used to perform any of the operations 0(a) to (h) to ensure that no undistributed copies of the original data, the fragments, keys, mapping and catalogue exist.

Through the use of a user-controlled interface, the Security System can operate on digital data belonging to the User (who may be an individual a group, or some other entity that has permission to have access or control of the Source Data) to retrieve the securely stored Source Data by:

(k) identifying the fragments, keys and mapping of keys to fragments and fragments to fragments, associated with any item of Source Data;

(l) collecting at least one copy of each fragment and one copy of each relevant key from the Storage Estate and decrypting the fragments;

(m) reassembling the fragments into a digital data replica of the Source Data; and (n) clearing down any temporary data storage and application platforms that were used to perform any of the operations (k) to 0(l).

The access by a User to the interface which recombines and presents reassembled fragments is controlled by an authentication process. The precise authentication process is not material to this Security System.

Additionally, the Security System provides for secure deletion of stored Source Data, which may be set to take place after expiry of a specified retention period, and for recovery of Source Data from a backup location or when the retention period has not yet expired.

The implementation of the Security System ensures that any "Administrator", being a person or entity with elevated security privileges, who has access to the Storage Estate, and who is not a User, is subject to appropriate restrictions, including that:

(i) no single Administrator has access to the Storage Estate containing more than one of either the fragments, or the encryption keys, or the mappings and the catalogue;

(ii) no single Administrator has the privileges to perform any bulk reassembly of fragments;

(iii) any bulk reassembly of fragments requires the cooperation of at least three Administrators, and the presence of the User with authorisation to request a bulk reassembly;

(iv) no backup copies of the fragments, encryption keys, the mappings and the catalogue are made to any elements of the Storage Estate that would violate the controls in (i) to (iii) hereof.

This means that the backup of Fragments cannot be made to a place that holds Keys or Catalogues, the backup of Catalogues cannot be to a place that also has Fragments or Keys, and the backup of Keys cannot be to a place that also holds Fragments or Catalogues.

BRIEF DESCRIPTION OF THE DRAWINGS

The various aspects of the invention will now be described in detail with reference to the accompanying drawings, in which:

FIG. 1 illustrates features of the Storage Estate in a system according to the invention;

FIG. 2 illustrates the process of fragmentation of the Source Data;

FIGS. 7(1)-7(3) provide a comparison of features of the present invention against a prior art system.

DETAILED DESCRIPTION

Figure 3:
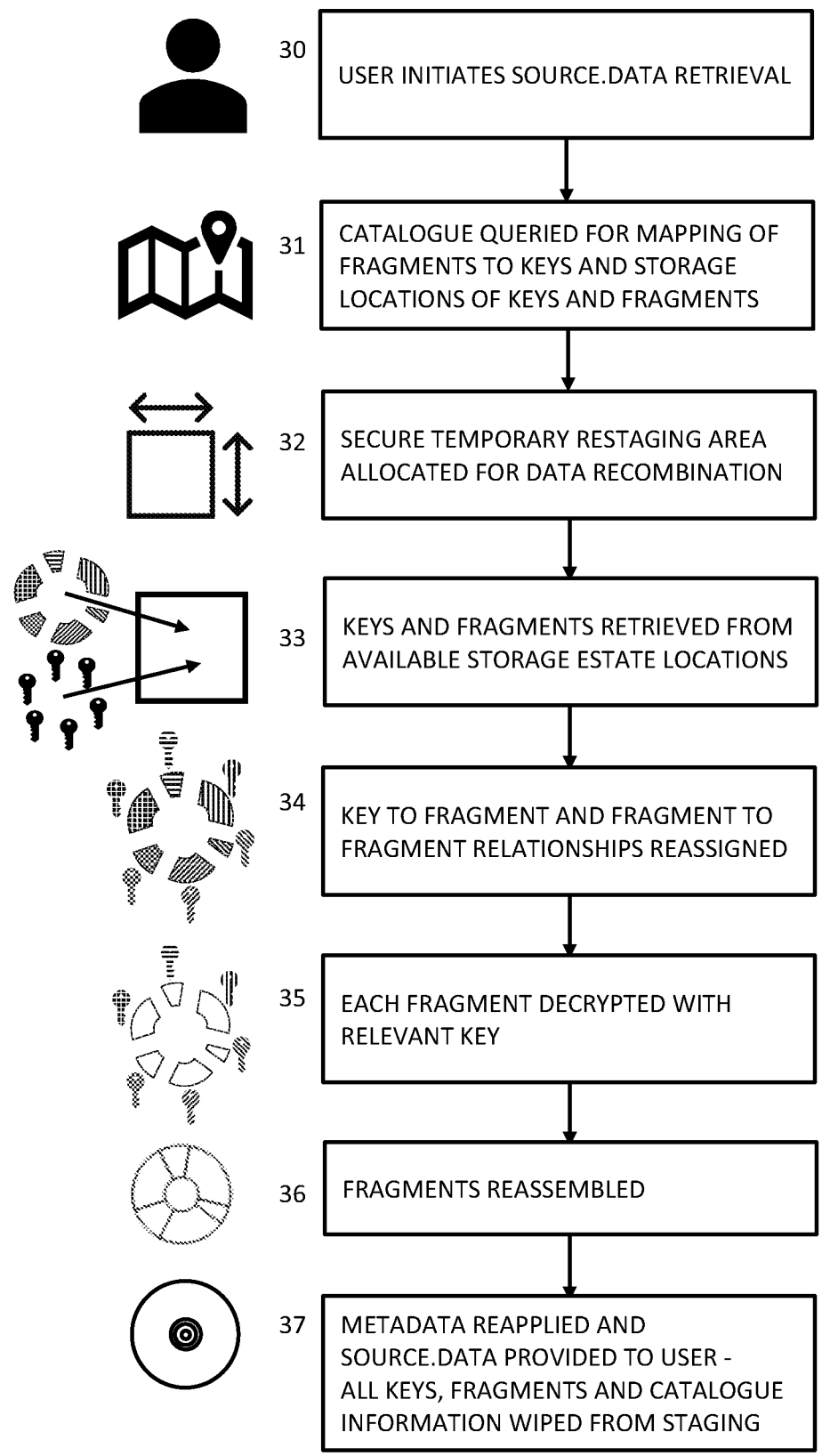
FIG. 3 illustrates the process of recombination of the Source Data.

A Security System according to the invention is enabled to carry out four forms of digital data operation on Source Data:

(1) SAVE;
(2) RETRIEVE;
(3) DELETE; and
(4) RECOVER.

The Security System employs a distributed Storage Estate 1 in which to store and secure (parts of) the Source Data, and the associated information required to carry out these operations. The Security System operates on individual or bulk Source Data. The Storage Estate is subject to Separation Rules as illustrated in FIG. 1, whereby the Storage Estate is configured to physically and logically separate components of the Security System relating to the Source Data including encrypted Fragments of the Source Data, encryption Keys for each of the Fragment, and a Catalogue of the Mapping relating to the Fragments, the Keys and the Source Data Metadata.

FIG. 1 illustrates one example design for the Storage Estate 1, although other designs are possible. It shows one implementation of suitable Separation Rules, although it will be clear that other combinations of rules for separating the stored data components, or parts of them, may also be applied to structure a suitable Storage Estate with distributed physical and logical locations.

In FIG. 1 the example Storage Estate 1 comprises a Primary and at least one physically and logically separated Secondary (i.e. backup) location for each of the Fragments, the Keys and the Catalogue of Mapping and Source Data Metadata. The Catalogue is located at a physical and logical Primary location 3 and at least one Secondary or other location 4. The Keys are located at a physical and logical Primary location 6 and at least one Secondary or other location 7. The Fragments are located at a physical and logical Primary location 9 and at least one Secondary location 10. Access to each of the stored components is enabled only for a separate, privileged Administrator—2 an Administrator "A", who only has access rights to the Catalogue and not to Fragments nor Keys; 5 an Administrator "B", who only has access rights to the Keys and not to Catalogue nor Fragments; and 8 an Administrator "C", who only has access rights to the Fragments and not to Catalogue nor Keys.

Back up and disaster recovery (BUDR) in the illustrated configuration is to other locations in the Storage Estate, such that no location contains more than one of the three Security System Components and is each accessible only by one appropriately privileged Administrator.

Users 11 may access the Storage Estate 1 via suitably secured remote access means 12 and upload or download original or reconstituted Source Data to designated temporary Staging Areas 13.

FIG. 2 illustrates the fundamental process of Fragmentation of the Source Data into randomly sized (substantially unpredictable) segments, which is essential to the improved level of data security offered in a Security System according to the invention. Fragmentation is an initial processing step performed when the SAVE operation is requested by a User, the User being an individual, group or other entity that has permission to have access to or control of the Source Data, and who is uniquely identified and associated with the Source Data. The Source Data is the digital data that is the subject of the SAVE operation. The specific means of User identification is not material to the Security System, and may use conventional techniques, such as multi-factor authentication, Security Identifier, certificate or other appropriate means.

Save Operation

When the User requests a SAVE, the Source Data is first staged—Step 20 in FIG. 2. Staging here refers to the process whereby the Source Data is copied to a temporary location 13 to be operated on by the Security System to complete one or other of the digital operations, but where such a copy is only available for as long as it takes for the selected operation to be completed. The Security System is agnostic to the means of staging.

When staged, the Security System processes the Source Data according to the following steps to complete the SAVE operation:

Catalogue (a) A Catalogue (which may be a data base, ledger or any other means of recording associated information) is created for the User/Source Data combination which contains the User identification information and Source Data Metadata (typically including, but not limited to, creation and modification dates, creator, data type, permissions and ownership). As indicated at Step 26 of FIG. 2, the Catalogue is replicated in at least one backup location to ensure the relevant information is available from at least a minimum of a resilient pair of Catalogues. When an entry is made to the Catalogue it is made to all the replicated Catalogues at the same time.

Fragmentation (b) The Security System calculates an upper limit (ULIM) to the number of possible Fragments that the Source Data may be split into. The precise formula by which ULIM is calculated may be varied according to system and security considerations. The actual formula used may include variables defined by the operators of the Security System, and these may also change on a randomised basis, making the calculation of ULIM effectively impossible without precise knowledge of the formula that was applied at any particular time. Conveniently, ULIM may be calculated using a formula with this basic structure:

$$ULIM = \text{Integer}\left(\frac{SDbyte}{MFbyte}\right) + N$$

where SDbyte is the number of bytes in the Source Data; MFbyte is the minimum number of bytes that can form a Fragment (the value of MFByte may change from time to time depending on circumstances or rules); and N is an integer constant—most simply, for example, N=1. The exact formula will be designed so that the result of the calculation is an integer value greater than or equal to 2.

(c) The Security System generates an integer random number (NFRAG) which is greater or equal to 2 and less than or equal to ULIM—Step 21 in FIG. 2. This random number is added to the Catalogue entry.

(d) The Source Data is then split into NFRAG Fragments, each of which is also a random number of bytes in size greater or equal to the minimum number of bytes that can form a Fragment, with the sum of the bytes of the Fragments equaling the number of bytes in the Source Data—Step 22 in FIG. 2.

Encryption (e) The Security System generates a separate cryptographic Key for each Fragment, Step 23 in FIG. 2. The method used to generate the cryptographic Keys is not material to the Security System, and may be any suitable method chosen to meet particular security characteristics or legal requirements.
(f) Each Fragment is encrypted with the appropriate Key—Step 24 in FIG. 2.

Storage
(g) A primary, and at least one secondary (backup) location are allocated in the Storage Estate 1 according to the relevant Storage Estate Separation Rules—Step 25 in FIG. 2.
(h) The Keys and the Fragments are given randomised identifiers and the Catalogue is updated with the relevant identifiers and the relationships between the Fragments—Step 26 in FIG. 2.
(i) The Keys are duplicated and are resiliently stored in appropriate areas of the Storage Estate in accordance with the Separation Rules—Step 27 in FIG. 2.
(j) The Fragments are duplicated and are resiliently stored in the appropriate areas of the Storage Estate in accordance with the Separation Rules—Step 28 in FIG. 2.
(k) The Source Data is securely erased from the staging location—Step 29 in FIG. 2.
(l) The User receives confirmation that the SAVE operation is completed and the Source Data has been securely saved.

Retrieve Operation
Retrieval of the Source Data is achieved by a process of Recombination, as illustrated in FIG. 3.
The User must again be an individual, group or other entity that has permission to have access to or control of the Source Data when it is retrieved from the Storage Estate.
(a) The User who is identified and associated with the Source Data initiates the request to RETRIEVE the Source Data—Step 30 in FIG. 3. (As for the SAVE and other operations, as noted above, the means used for USER identification is not material to the Security System).
(b) The Catalogue is queried for the User/Source Data combination and the number of Fragments, and the identity and location information for the Keys and Fragments is extracted—Step 31 in FIG. 3.
(c) A restaging area is allocated—the restaging area has the same purpose as the staging area in simply providing a temporary location for storage, in this case of the data undergoing recombination—Step 32 in FIG. 3. The Keys and Fragments are retrieved from the appropriately available primary storage locations in the Storage Estate—Step 33 in FIG. 3.
(d) Each Key is matched to the appropriate Fragment, and the Fragment to Fragment relationships are recreated—Step 34 in FIG. 3.
(e) The Fragments are each decrypted by the relevant Key—Step 35 in FIG. 3.
(f) The Fragments are re-assembled—Step 36 in FIG. 3.
(g) The Catalogue is queried for Source Data Metadata which is reapplied to the reassembled Fragments, completing the recombination of the Source Data, which is then made available to the User—Step 37 in FIG. 3.
(h) Finally, the Keys, Fragments and Mapping information are securely wiped from the restaging area.

If the RETRIEVE operation encounters an error or problem in executing the Recombination process to reassemble the complete Source Data, for example if a check to validate the integrity of the reassembled Source Data indicates that the data may have been corrupted, then the RETRIEVE operation can be set to use the secondary (or other if more than one) backup Catalogue and to retrieve the Fragments and Keys from the appropriate corresponding backup storage locations.

Figure 4:
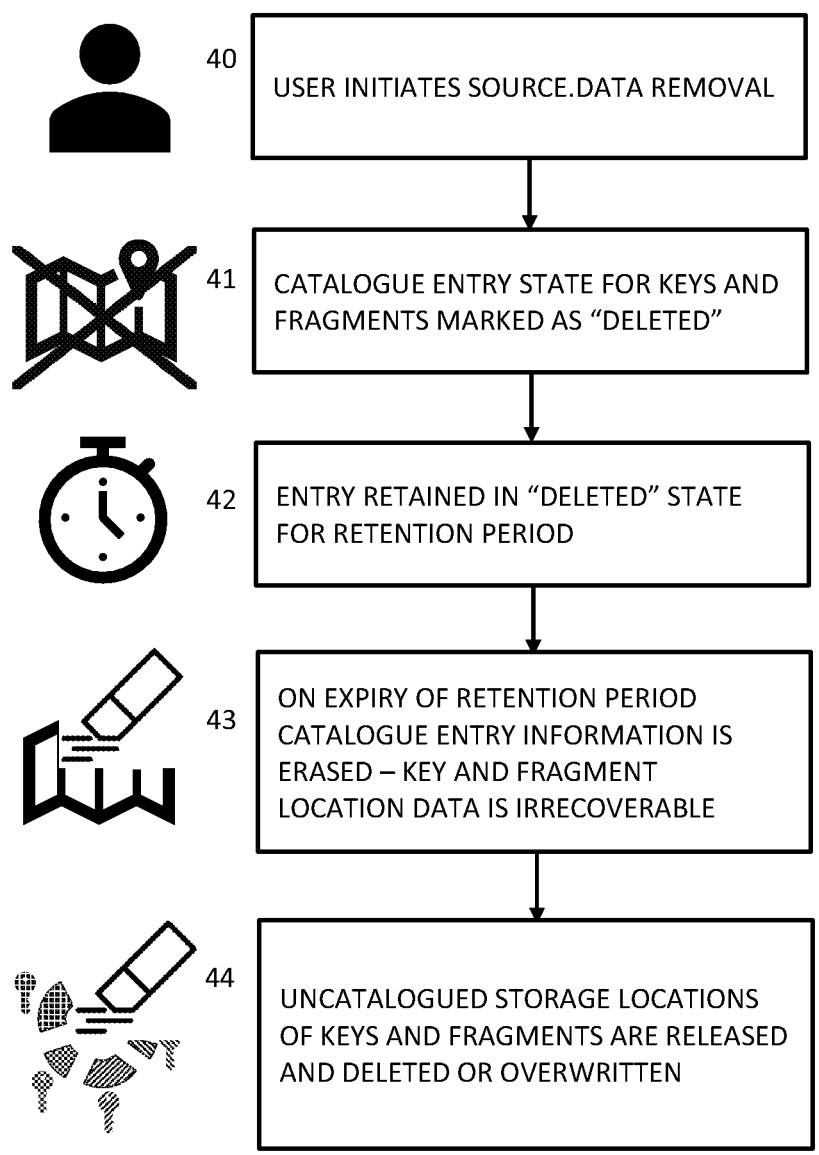
FIG. 4 illustrates the process of removal of data from the Storage Estate.

Delete Operation
Deletion of the stored, fragmented and encrypted data is achieved by a Removal process as illustrated in FIG. 4.
(a) The User who is uniquely identified and associated with the Source Data initiates the DELETE operation to remove the Source Data—Step 40 in FIG. 4.
(b) The State of Catalogue entry (including all replicas) relating to the User/Source Data combination is changed from "Active" to "Deleted"—Step 41 in FIG. 4. At this time the Catalogue entry still exists and the Source Data could still be retrieved through a User initiated Recover operation (see below).
(c) The Catalogue "Deleted" State is reviewed after a defined Retention Period, which may be set by the User or otherwise fixed, for example, in accordance with a business, data retention policy, legal or compliance requirements. The Retention Period may be set from zero (0) seconds to any desired longer period, the value of which is not material to the Security System—Step 42 in FIG. 4.
(d) Upon the expiry of the Retention Period, the mapped locations for the Fragments and the Keys are marked as Junk Data in the Storage Estate data availability index, and the actual Catalogue entry, for all relevant Catalogues across the entire Storage Estate, is deleted. In effect, there is no longer any available mapping of which Key applies to which Fragment, nor how the Fragments relate to one another, nor how many Fragments the Source Data had been divided into, nor any Source Data Metadata—Step 43 in FIG. 4.
(e) Junk Data in the Storage Estate is beyond recovery as there is no means of identifying decrypting and recombining such data. Junk Data may be immediately overwritten or otherwise deleted as part of the re-provisioning of the Storage Estate for staging or further data storage—Step 44 in FIG. 4.

Figure 5:
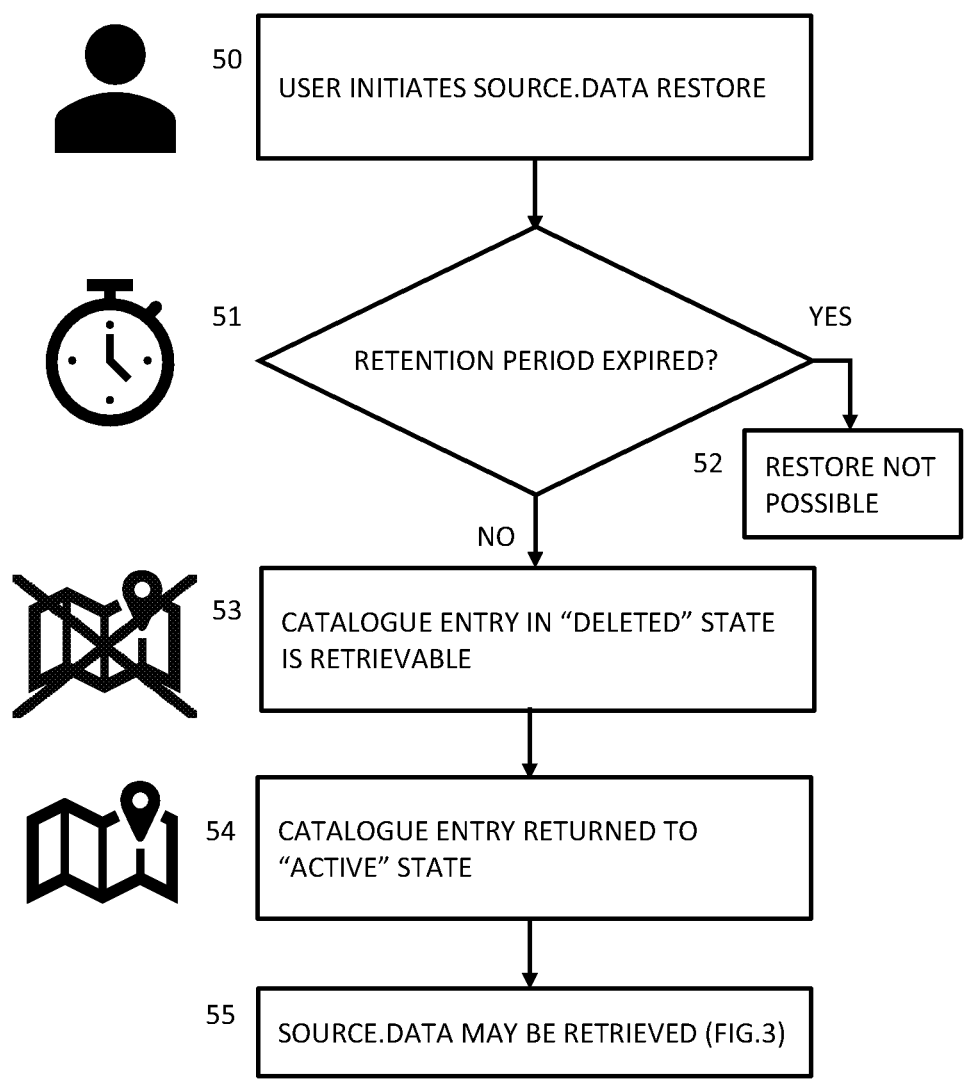
FIG. 5 illustrates the process of recovery of data from a backup.

Recover Operation
Recovery of Deleted data is achieved by a Restore process as illustrated in FIG. 5.
(a) The User who is uniquely identified and associated with the Source Data initiates the RECOVER operation to restore the Source Data—Step 50 in FIG. 5.
(b) The Security System checks that the Retention Period for deleted Source Data has not expired—Step 51 in FIG. 5. If the Retention Period has expired 52 then the data is irrecoverable and the User informed accordingly. If the Retention Period has not expired, the process continues.
(c) The Catalogue entry for the relevant User/Source Data combination is located—Step 53 in FIG. 5—and entry State changed from "Deleted" to "Active"—Step 54 in FIG. 5.
(d) As the mappings have not been destroyed, and the Key and Fragment data has not been deleted, recovery is completed using the RETRIEVE operation recombination process—Step 55 in FIG. 5—by following the Steps in FIG. 3, as described above.

A Security System according to the invention thus provides a highly secure means to store and control digital data (referred to as Source Data) of any form, through the use of doubly randomised fragmentation and encryption of the Source Data. Splitting the Source Data into a random number of Fragments of randomised unequal size (in bytes or other memory units), and employing a random naming convention for identifying stored keys and fragments, prevents threat actors, whether hackers, insiders or automated systems, from having clarity of the number of Fragments required and their sizes in order to reassemble the Source Data and renders it computationally impracticable for threat actors to develop tools or techniques using computational brute force, that could iterate through the total number of permutations and combinations of Fragments, thereby effectively eliminating the potential for a brute force attack to succeed in reassembling the encrypted Source Data.

Creating separate encryption Keys for each Fragment, and applying them to create encrypted Fragments of randomised unequal size, further increases the complexity of the computational brute force which would be necessary to decrypt Fragments into a state that recombination could even be attempted.

Creating a Catalogue of the mappings of Keys to Fragments, and the relationship of Fragments to Fragments, presents the only means by which the doubly randomised, encrypted Fragments may be located, decrypted and recombined. This is potentially the weakest point in the Security System. That is why it is the most tightly controlled piece in the System. This is a massive improvement on the Source Data openness in most other model. Access to the Catalogue can be tightly controlled and highly restricted. The Catalogue would typically be relatively tiny in memory and storage terms compared with the Source Data as a whole and, as explained below, it may also be subject to cascaded fragmentation and encryption as Source Data itself.

Cascade Fragmentation

The Catalogue, when considered to be Source Data, may also be operated on by the Fragmentation process (essentially by iteration of the Steps of FIG. 2) with the result that the first level Catalogue is itself split into Fragments, with separate Fragments and encryption Keys for the Catalogue Fragments, and with appropriate mappings in a second level Catalogue.

This process of Cascade Catalogue Fragmentation may be applied to the respective Catalogue at each successive level and repeated limitlessly to as many levels as desired. Each application adds another layer of complexity that amplifies the difficulties faced by threat actors, and the computational burden necessary to attempt to recombine each previous level of Source Data and eventually to reach the first level Catalogue to have a chance of recombining the original Source Data itself.

The process of Cascade Fragmentation is equally applicable to any data type. Encryption Keys, when considered to be Source Data, may also be operated on in a process of Cascade Key Fragmentation whereby the first level encryption Keys are split into Fragments, with separate second level encryption Keys for these Fragments, and with appropriate mappings in a second level Catalogue entry. The repeated application of the fragmentation and encryption processes to encryption Keys, encryption Keys of encryption Keys, and so on, may likewise be performed limitlessly to as many levels as desired.

Similarly, each encrypted Fragment is a form of digital data and, as such, may be considered to be Source Data. Cascade Fragment Fragmentation may be applied so that the encrypted lower level Fragments are split into next level Fragments, with encryption Keys for these next level Fragments, and with appropriate next level mappings in a next level Catalogue, and so on.

Metadata is also a form of digital data and, as such, may be considered to be Source Data. Cascade Metadata Fragmentation may be applied to split lower level Metadata into Fragments, with separate next level Fragments and encryption Keys of these Metadata, and again with appropriate next level mappings in a next level Catalogue entry.

Padding Fragments

Figure 6:
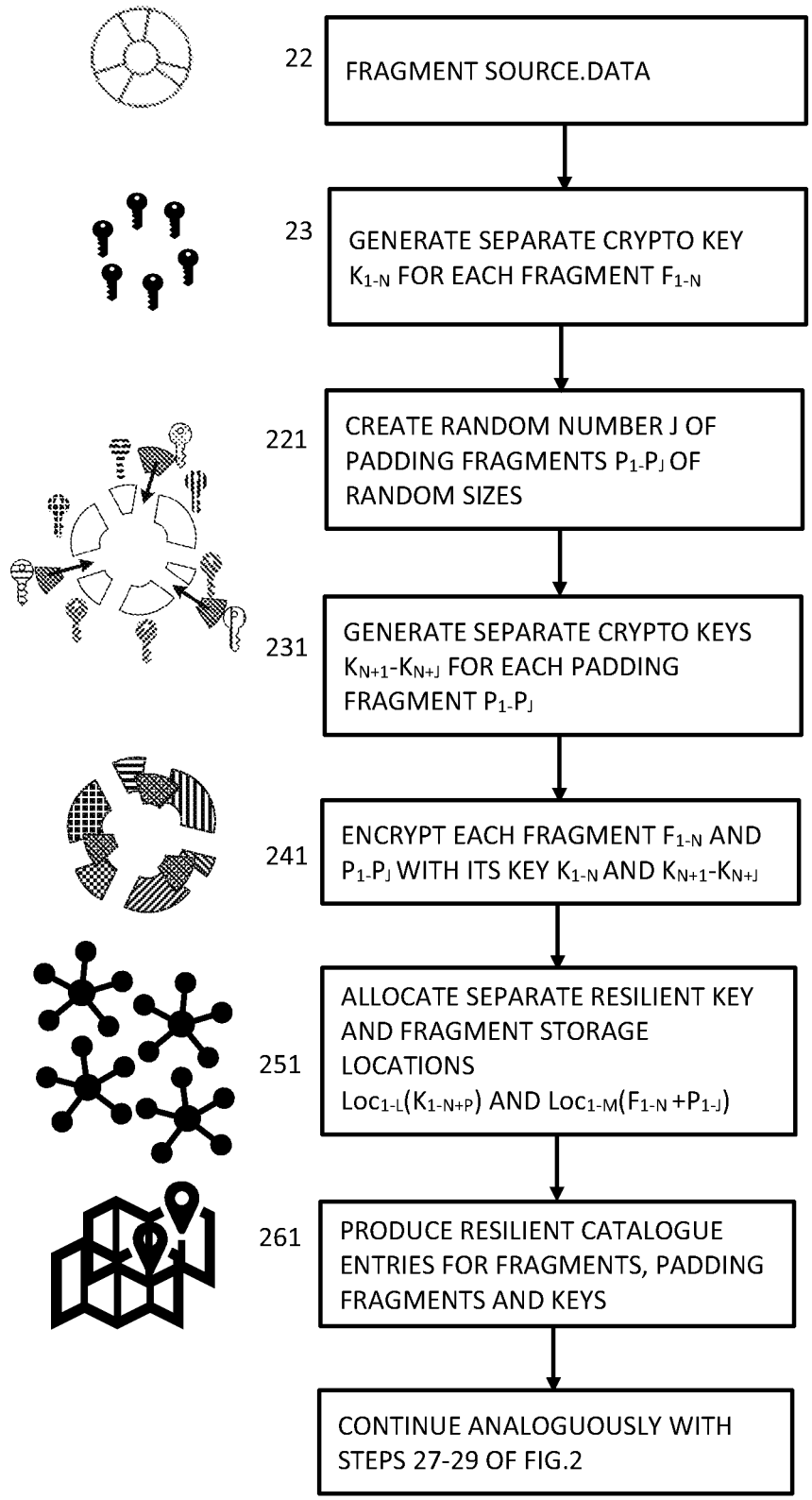
FIG. 6 illustrates the optional addition of Padding Fragments.

It is possible to add further complexity to the Fragmentation process by adding dummy data, in the form of Padding Fragments that contain no meaningful data, to the original fragmented Source Data. As illustrated in FIG. 6, this comprises introducing additional Steps 221-261 between or in parallel with Steps 22-25 of the basic Fragmentation process shown in FIG. 2. A random number of Padding Fragments of random size are inserted into the actual Source Data mapping (Step 221 in FIG. 6). The locations of these insertions may be recorded in a separate Padding Catalogue from the standard mapping Catalogue. The Fragmentation process then follows with the generation of random encryption Keys for the Padding Fragments 231, the encryption 241 of all the Fragments, including the Padding Fragments (Step 231 in FIG. 6), and the creation of mapping entries in the Catalogue and the separate storage of all the components in the appropriate locations 251 across the Storage Estate, with the only additional operation being the management of the Catalogue(s) for the Padding Fragments, as shown in Step 261 in FIG. 6.

The processes of Recombination, Removal and Restore are as set out above, with the added step that the Padding Catalogue is consulted prior to reassembly in Recombination to establish whether Padding Fragments have been included, and the Padding Fragments are omitted when recombining the fragments into the Source Data.

Security is further enhanced as any threat actor would need to acquire four complete components (the Keys, the Fragments, the Catalogue and the Padding Catalogue information) in order to access Source Data, rather than three components. Where before the standard mapping Catalogue was the only component that needed the highest degrees of information security, it would be possible to transfer this requirement for the highest degrees of information security to a separated Padding Catalogue and (possibly) reduce the information security burden associated with the standard mapping Catalogue.

The variable degree of complexity (i.e. there is no a priori means of knowing how many times Source Data or any of its components have undergone any Cascade Fragmentation) and uncertainty (i.e. the Source Data is split into a random number of fragments, of random size, each with a separate encryption Key plus a random number of Padding Fragments) employed by the Security System according to the invention, also potentially even renders Quantum Computed Decryption efforts useless. Quantum Computed Decryption requires an understanding of the state of an object to be decrypted in order for the superposition of all states to be computed. The Security System has no predetermined fixed State (i.e. the number, size, configuration, keys, padding elements and locations are all variable) and, as a result, it is not possible to present a Quantum Computer with any fixed state for superposition computations.

Differences from Prior Art Methods

With reference to FIGS. 7(1), 7(2) and 7(3), it is instructive to compare and contrast the methods according to the present invention (M1) as described above with prior art systems, such as have been described in WO 2010/135412 "Systems and methods for securing data in the Cloud" (D1).

The principal method M1 of the present invention, that outlined in D1, and like methods begin with identifying the target Source Data 71, 171 scheduled for secure storage. M1 immediately creates a Catalogue entry 172, which is not core to the approach set out in D1, which provides such corresponding form of specialised Catalogue.

M1 next generates a random number 173 of any size greater than two (and bounded by ULIM—see above). D1 proposes possibly splitting its Source Data into segments but, in practice, as will be explained below, has practical limitations for situations where the number of segments is greater than five. The primary example given in D1 is for the special case where the number of segments is one (i.e. the Source Data is not segmented or fragmented at all). In this case, the storage and computational burden is relatively low, where for every 2 kbytes of Source Data the method of D1 requires 10 kbytes of storage.

M1 then updates the Catalogue 174 and fragments 175 the Source Data into the random number of fragments each of a random size. M1 then updates the Catalogue again 176. In principle, an ostensibly similar splitting process may be employed in a method of D1 by segmenting its source data. This process 75 will be illustrated by considering how that approach operates when the number of segments is just two.

At step 77, D1 generates a pair of random numbers ($R_1$, $R_2$ and $R_3$, $R_4$), of the specified size of each segment, for each segment $S_1$, $S_2$. Using these random numbers, a series of binary operations 78 is performed using the random numbers ($R_1$, $R_2$ and $R_3$, $R_4$), and the Source Data segments $S_1$, $S_2$. Thereafter, at step 79, D1 includes operations to combine selected pairs of the results of the binary operations and the random numbers. As a result, the method of D1 potentially requires creation of 10 kbytes of new data for every 2 kbytes of Source Data where the number of segments is two, and this rises to 176 kbytes of new data for every 2 kbytes of Source Data if the number of segments is increased to just three, and to 782 kbytes of new data for every 2 kbytes of Source Data if the number of segments is increased to five. The growth of data for the method of D1 follows the formula $2N(2N)!/(2N-2)!-(N-1)(2N)!/\{(2N-2)!2!\}+2N^2+2N+2$ times the size of the storage of the Source Data divided by N, where N is the number of fragments and "!" is the mathematical operation "factorial". The operations at step 79 may create some duplicates 80. If $S_1$ and $S_2$ are of the same size, there would be $2N(2N)!/(2N-2)!-(N-1)(2N)!/\{(2n-2)!2!\}$ unique values, which may lead to a slight reduction in the storage required. In contrast, the method M1, generates only 2 kbytes of new data for every 2 kbytes of Source Data, plus a fixed amount of Catalogue data (typically circa 0.1 kbytes) using its more memory efficient fragmentation scheme.

Both M1 and D1 employ some form of cryptography 81, 181 to encrypt the respective results of their operations on the Source Data and both methods apply 82, 182 the cryptographic techniques to their data. M1 requires N computational operations (where N is the number of fragments), whereas the method of D1 requires $2N(2N)!/(2N-2)!-(N-1)(2N)!/\{(2N-2)!2!\}+2N^2+2N+2$ operations for N segments, which is a significantly greater computational burden.

M1 then updates the Catalogue 183, allocates segregated storage 184 and then distributes 185 the encrypted fragments into the storage. D1 allocates storage for encrypted selected sets of data 84 and stores 85 the sets without any corresponding cataloguing.

M1 creates resilient versions 186 of the Catalogue, cryptographic keys and fragments 188 and cross-referenced resilient Catalogue entries 191, stored separately 189-190 in accordance with the Storage Estate separation rules. By way of illustration, simplified tabular examples of the sort of data which would be stored in the replicate catalogues are illustrated at 192, and include elements such as the replica catalogue IDs, the relevant source dataset name, dataset status, the number of fragments comprising this dataset, the separate fragment and key IDs, and respective storage locations (each named with a separate random ID to render association more difficult for an unauthorised intruder to distinguish).

The method of D1 is resilient in a different manner, which is dependent on the availability of selected subsets of the $2N(2N)!/(2N-2)!-(N-1)(2N)!/\{(2N-2)!2!\}+2N^2+2N+2$ operators that were created at steps 79 and 82. If there are M replicas of D1's encrypted sets of data, then D1 requires M times $2N(2N)!/(2N-2)!-(N-1)(2N)!/\{(2N-2)!2!\}+2N^2+2N+2$ greater storage than the original Source Data with the possibility of some reduction if there are duplicates. In the case of duplicates, it is necessary to perform some comparative computational operations to establish which duplicates may be discarded, thus adding yet more computational and organisational burden to any practical implementation of the method of D1.

In contrast, for M1, if there are M replicas of resilient fragment and key data then for every 1 kbyte of Source Data there are 2M kbytes of key and fragment data, and if there are P replicas of the Catalogue there are 0.1P kbytes of Catalogue in total.

Methods like D1 all suffer from the storage growth and computational and organisational complexity associated with the operations set out in Steps 77-79 and 82. Such steps are avoided in M1 by employing a specialised Catalogue which is a central aspect of the methods set out in the present application.

The methods set out in this application provide significantly greater data security than other approaches because all of the following have to be true—all of the fragments must exist, all of the cryptographic keys must exist, and at least one Catalogue entry must exist that can be used to locate the fragments and corresponding keys, and to reorder the decrypted fragments into the sequence necessary for recombination. The absence of any one fragment, any one key or any one entry in the catalogue makes the recombination into Source Data impossible.

The method of D1 and others that are similar, lack this level of data security.

What is claimed is:
1. A method of secure storage and processing of digital information, provided as source data for a specified user, the method comprising:
  (a) creating and storing, according to applicable storage estate separation rules, in a digital storage estate of multiple logically and physically separate storage locations, a primary digital catalogue, and at least one physically and logically separated secondary (backup) digital catalogue, each of the digital catalogues containing user identification information and source data metadata for verification of the user's authorisation to access and manipulate the source data;
  (b) calculating, according to a number of bytes in the source data (SDbyte) and a minimum number of bytes that can form a fragment (MFbyte), an upper limit (ULIM) to a number of possible fragments into which the source data may be split;
  (c) splitting the source data into an integer number (NFRAG) of fragments, each of which is also a random number of bytes in size greater or equal to the minimum number of bytes that can form a fragment (MFbyte), with the sum of the bytes of the fragments at least equaling the number of bytes in the source data (SD-byte);

(d) naming each of the fragments in a manner that prevents association of the fragments with one another, and prevents association of the fragments with the source data;

(e) mapping the named fragments to one another to create a recombination mapping that allows for recombination of the fragments;

(f) generating a separate respective key for each of the fragments;

(g) for each of the keys, naming the key in a manner that prevents association of the key with any of the other keys, and prevents association of the key with any of the fragments;

(h) encrypting each of the fragments with its respective key;

(i) cataloging the relationships between the fragments, their respective keys, and the recombination mapping to form a relationship catalog;

(j) duplicating, one or more times, each of the encrypted fragments, each of the keys, the recombination mapping, and the relationship catalogue;

(k) allocating, according to the applicable storage estate separation rules, in the digital storage estate of multiple logically and physically separate storage locations, a primary, and at least one secondary (backup) storage location for the encrypted fragments, the keys, the relationship mapping, and the relationship catalog;

(l) distributing the duplicated encrypted fragments, the keys, the recombination mapping, and the relationship catalogue across the storage locations; and (m) updating the relationship catalogue with relevant identifiers and with relationships between the fragments the keys, the relationship mapping, and the primary and secondary storage locations thereof.

2. The method of secure storage and processing of digital data according to claim 1, further comprising the following steps for retrieval of securely stored data:

(a) receiving, and validating, a request by a user for retrieval of specified stored source data, said validating including querying at least one of the digital catalogues to retrieve the user identification information and source data metadata for the user;

(b) obtaining from the relationship catalogue the number of fragments, and the identity and location information for the keys and fragments for the specified source data;

(c) retrieving the obtained keys and fragments from at least one of their primary and secondary storage locations in the storage estate;

(d) matching each of the retrieved keys to its corresponding retrieved fragment, and decrypting each of the retrieved fragments with its key; and (e) recombining the decrypted retrieved fragments into their original relationships in the specified source data and making the recombined specified source data available to the user.

3. The method of secure storage and processing of digital data according to claim 1, further comprising the following steps for deletion of securely stored data:

(a) receiving, and validating a user request for deletion of specified stored source data, said validating including querying at least one of the digital catalogues to retrieve the user identification information and source data metadata for the user;

(b) updating in the relationship catalogue data on the number of fragments, and the identity and location information for the keys and fragments for the specified source data to change the status of the specified source data to "Deleted"; and (c) upon expiry of a retention period, which is set by the user, or otherwise in accordance with applicable requirements, from zero (0) seconds to any longer period, releasing for other use the mapped primary and all other locations in the storage estate of the fragments and the keys for the specified source data, and deleting all digital catalogues for the specified source data across the entire storage estate.

4. The method of secure storage and processing of digital data according to claim 3, further comprising the following steps for recovery of deleted stored data:

(a) receiving, and validating a user request for recovery of deleted specified source data that is recorded in the relationship catalog with a "Deleted" data status, said validating including querying at least one of the digital catalogues to retrieve the user identification information and source data metadata for the user;

(b) confirming whether the retention period for the deleted specified source data has not expired and, if the retention period has not expired, updating in the relationship catalogue data on the number of fragments, and the identity and location information for the keys and fragments for the specified source data to change the status of the specified source data to "Active"; and (c) retrieving the specified source data using the method of claim 2, steps (c) to (e).

5. The method according to claim 1, further including the steps of:

(i) allocating, prior to storage or retrieval of the source data, a staging location in the storage estate for temporary storage of the fragments and keys of the source data during processing thereof; and (ii) after completion of the storage or retrieval of the source data, securely deleting all data from the staging location.

6. The method of secure storage and processing of digital information according to claim 1, further comprising reprocessing at least one of the stored data fragments, the stored data keys, and the digital data catalogues according to the method of claim 1 to provide a further level of fragmentation and encryption.

7. The method of secure storage and processing of digital information according to claim 6, wherein the said method is repeated multiple times on each successive layer of stored data fragments, stored data keys, and/or digital data catalogues to provide multiple levels of fragmentation and encryption.

8. The method of secure storage and processing of digital information according to claim 1 further including the additional steps of:

(i) adding dummy data, in the form of padding fragments that contain no meaningful data, to the fragments of the source data;

(ii) recording the locations of the padding fragments in a padding catalogue that is separate from the relationship catalogue;

(iii) generating random padding encryption keys for the padding fragments, and encrypting the padding fragments using the padding encryption keys;

(iv) creating padding mapping entries in the relationship catalogue; and (v) storing all of the padding fragments and padding encryption keys separately in appropriate locations across the storage estate.

9. The method of secure storage and processing of digital information according to claim 8 wherein in step (i) a random number of the padding fragments of random size are added to the fragments of the source data.

10. The method of secure storage and processing of digital information according to claim 1, wherein a random naming convention is employed to identify individual fragments and keys.

11. A secure storage system for storage and processing of digital information, held as source data for a specified user, the system comprising:
   a computing device having access to a storage estate comprising a plurality of physically and logically separated and distributed digital storage locations;
   the storage estate being configure to store, for each user and source data combination, a primary digital catalogue and at least one secondary (backup) catalogue containing user identification information and source data metadata that can be used to verify the user's authorisation to access and manipulate the source data, the primary digital catalogue and each of the secondary catalogues being separately stored in different ones of said digital storage locations in the storage estate in accordance with applicable storage estate separation rules;
   the computing device being programmed, upon user request, to perform the steps of:
   (a) creating and storing, according to applicable storage estate separation rules, in a digital storage estate of multiple logically and physically separate storage locations, a primary digital catalogue, and at least one physically and logically separated secondary (backup) digital catalogue, each of the digital catalogues containing user identification information and source data metadata for verification of the user's authorisation to access and manipulate the source data;
   (b) calculating, according to a number of bytes in the source data (SDbyte) and a minimum number of bytes that can form a fragment (MFbyte), an upper limit (ULIM) to a number of possible fragments into which the source data may be split;
   (c) splitting the source data into an integer number (NFRAG) of fragments, each of which is also a random number of bytes in size greater or equal to the minimum number of bytes that can form a fragment (MFbyte), with the sum of the bytes of the fragments at least equaling the number of bytes in the source data (SDbyte);
   (d) naming each of the fragments in a manner that prevents association of the fragments with one another, and prevents association of the fragments with the source data;
   (e) mapping the named fragments to one another to create a recombination mapping that allows for recombination of the fragments;
   (f) generating a separate respective key for each of the fragments;
   (g) for each of the keys, naming the key in a manner that prevents association of the key with any of the other keys, and prevents association of the key with any of the fragments;
   (h) encrypting each of the fragments with its respective key;
   (i) cataloging the relationships between the fragments, their respective keys, and the recombination mapping to form a relationship catalog;
   (j) duplicating, one or more times, each of the encrypted fragments, each of the keys, the recombination mapping, and the relationship catalogue;
   (k) allocating, according to the applicable storage estate separation rules, in the digital storage estate of multiple logically and physically separate storage locations, a primary, and at least one secondary (backup) storage location for the encrypted fragments, the keys, the relationship mapping, and the relationship catalog;
   (l) distributing the duplicated encrypted fragments, the keys, the recombination mapping, and the relationship catalogue across the storage locations; and
   (m) updating the relationship catalogue with relevant identifiers and with relationships between the fragments the keys, the relationship mapping, and the primary and secondary storage locations thereof.

12. The secure storage system for storage and processing of digital information according to claim 11, wherein the computing device is further programmed to securely process the source data by performing the steps of:
   (a) receiving, and validating, a request by a user for retrieval of specified stored source data, said validating including querying at least one of the digital catalogues to retrieve the user identification information and source data metadata for the user;
   (b) obtaining from the relationship catalogue the number of fragments, and the identity and location information for the keys and fragments for the specified source data;
   (c) retrieving the obtained keys and fragments from at least one of their primary and secondary storage locations in the storage estate;
   (d) matching each of the retrieved keys to its corresponding retrieved fragment, and decrypting each of the retrieved fragments with its key; and
   (e) recombining the decrypted retrieved fragments into their original relationships in the specified source data and making the recombined specified source data available to the user.

13. The method of secure storage and processing of digital data according to claim 3, further comprising optionally, overwriting the released data locations immediately with other data.

* * * * *